Shimizu et al.

[11] Patent Number: 4,556,876
[45] Date of Patent: Dec. 3, 1985

[54] DISPLAY DEVICE WITH DELAY TIME COMPENSATION

[75] Inventors: Osamu Shimizu; Hirofumi Goto; Fumio Matsukawa, all of Amagasaki, Japan

[73] Assignees: Mitsubishi Jidosha Kogyo Kabushiki Kaisha, Shiba; Mitsubishi Denki Kabushiki Kaisha, Tokyo, both of Japan

[21] Appl. No.: 418,299

[22] Filed: Sep. 15, 1982

[30] Foreign Application Priority Data

Sep. 22, 1981 [JP] Japan .................. 56-150315
Jan. 22, 1982 [JP] Japan .................. 57-8412

[51] Int. Cl.⁴ .................................. G09G 3/00
[52] U.S. Cl. ......................... 340/713; 340/763; 340/812; 340/805
[58] Field of Search ............. 340/713, 714, 805, 802, 340/784, 785, 814, 811, 812

[56] References Cited

U.S. PATENT DOCUMENTS 3,907,405  9/1975  Fukai et al. .................. 340/713
3,973,254  8/1976  Nomiya et al. ............... 340/802
4,338,623  7/1982  Asmus et al. ................. 340/713

Primary Examiner—Marshall M. Curtis
Attorney, Agent, or Firm—Robert E. Burns; Emmanuel J. Lobato; Bruce L. Adams

[57] ABSTRACT

According to the present invention, the driving timing for each segment in a segment type digital display unit can be controlled independently on the basis of either one or both of the lighting history of each segment stored in a memory section and a detected temperature from a temperature detector mounted near segments. Therefore, the discriminatability particularly at low temperatures can be improved with little influence of the temperature and lighting history of segments.

14 Claims, 5 Drawing Figures

DISPLAY DEVICE WITH DELAY TIME COMPENSATION

BACKGROUND OF THE INVENTION

1. Field of the Invention

The present invention relates to an improvement of a segment type digital display device using particularly liquid crystal and electrochromic.

2. Description of the Prior Art

At present, liquid crystal and electrochromic are used in digital display devices, but their response speed in display greatly changes, often affecting the discriminatability through sight.

More particularly, the response speed of liquid crystal is low at low temperatures, and a certain liquid crystal has a drawback such that its response at the time of OFF (extinguishing) is slow as compared with that at the time of ON (lighting). As a result, for example in a 7-segment type liquid crystal display device, when a numeric display "1" is going to change into "2", there temporarily appears "2" resulting from overlap of the numerals "1" and "2". Besides, at low temperatures, such a transitional display continues to appear for a relatively long time, thus causing deterioration of discriminatability and a misunderstanding.

In general, when a segment has changed from OFF state to ON state, if viewed in a certain time range only, there is the tendency that the longer the OFF state just before ON, the greater the response delay. According in case plural segments turned ON from OFF, they do not become discriminatable at a same time but become discriminatable at random, and the display of a meaningless pattern results. Thus, the deterioration of discriminatability is so much accelerated.

In conventional display devices, in an effort to eliminate such drawbacks, a heater is provided and is operated when the temperature falls below a predetermined level to maintain the temperature of the display devices at above the predetermined level. In this case, however, the heater and its controlling unit are needed, to the display devices using them become large in size and require a large electric power for operating the heater, thus resulting in increased cost. In addition, pre-heating is required for obtaining an exact display. Thus, the service characteristics of those display devices have been poor.

SUMMARY OF THE INVENTION

The present invention eliminates the aforementioned drawbacks. It is the object of the invention to provide a display device capable of compensating the delay time for response of segments.

In order to achieve the above-mentioned object, the display device of the present invention having a segment type digital display unit comprises a memory section for storing ON or OFF history of each segment in the display unit, a temperature detector for detecting the temperature near or around the display unit, and a control section for controlling the driving timing for each segment in the display unit independently on the basis of either one or both of an ON or OFF history from the memory section and a detected temperature from the temperature detector.

Therefore, the display device with delay time compensation of the present invention is advantageous in that the discriminatability through sight at low temperatures can be improved.

DESCRIPTION OF THE PREFERRED EMBODIMENTS

The following embodiments of the present invention are given to further illustrate the invention.

Figure 1:
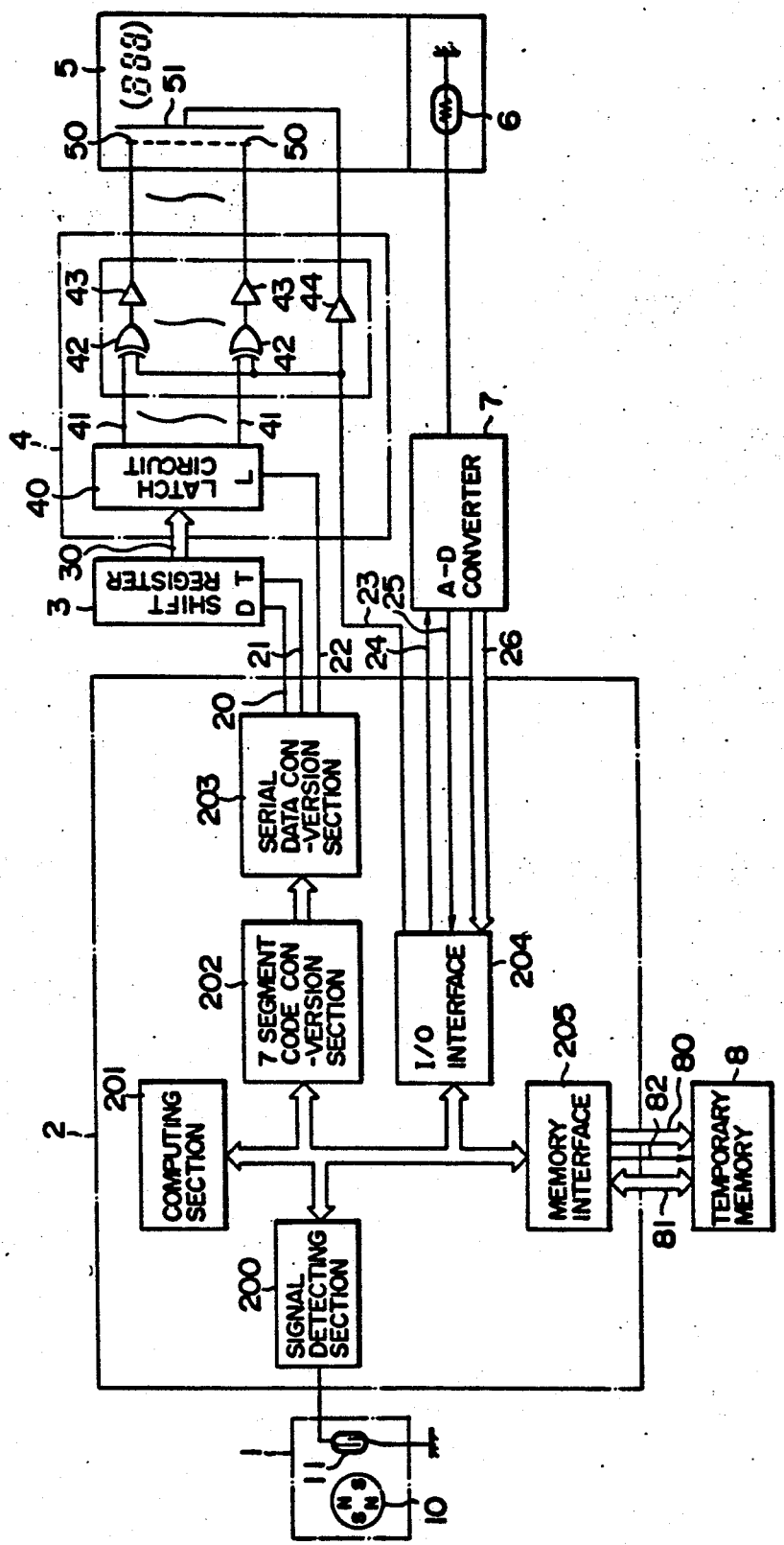
FIG. 1 is an electrical circuit diagram according to a first embodiment of the present invention.

In the embodiment shown in FIG. 1, a vehicular speedometer comprises a vehicle speed sensor 1, a processing unit 2, a shift register 3, a latch driver 4, a 3-digit 7-segment digital display unit 5, a temperature detector 6, an A-D converter 7 and a temporary memory 8. The vehicle speed sensor 1 comprises a magnet 10 interlocked with the output shaft of a vehicular transmission or an axle, and a reed switch 11 which is turned ON and OFF by the magnet 10. In the processing unit 2 which constitutes a control section, a signal from the vehicle speed sensor 1 is detected by a signal detecting section 200, and a computing section 201 computes a vehicle speed from the number of interval of ON-OFF pulses. The display contents of the computed vehicle speed is subjected to code conversion in a 7-segment code conversion section 202 and then converted in a serial data conversion section 203 into serial data of a sequence corresponding to the arrangement of display segments of the digital display unit 5 for turning the segments ON and OFF, and then are output as serial ON-OFF output data 20. The serial ON-OFF data 20 are delivered to the shift register 3 in synchronism with clock signals 21, and when signals for all the segments have been transmitted to the shift register 3, a latch signal 22 is generated. Output data 30 from the shift register 3 is input to the latch driver circuit 4, and upon generation of the latch signal 22 the output data 30 is input into a latch circuit 40. As a result, ON-OFF signals are output as latch output data 41 from the latch circuit 40. On the other hand, in order to drive the digital display unit 5 formed of liquid crystal with an alternating voltage, an AC driving signal 23 is output from an I/O interface 204. The AC driving signal 23 and the latch output data 41 as ON-OFF signals are input into Exclusive-OR gates 42 to generate segment driving signals, which signals are output through segment signal output buffers 43 to segment electrodes 50 of the digital display unit 5. Furthermore, the AC driving signal 23 is output through an AC driving signal output buffer 44 to a common electrode 51 of the digital display unit 5, and in cooperation with the segment electrodes 50, the vehicle speed is displayed. The processing unit 2 transmits data to the shift register 3 at every 10 ms and operates to renew the display at every 500 ms. The temperature detector 6 is a thermistor, and the temperature detector 6 send data on the ambient temperature of the digital display unit 5 to the processing unit 2 through the A-D converter 7. In A-D conversion, the computing section 201 outputs a conversion start command as a conversion start signal 24 to the A-D converter 7 through the I/O interface 204. As a result, the A-D converter 7 starts converting an analog signal determined by the temperature detector 6 into a digital value. Upon completion of this conversion, the A-D converter 7 outputs a conversion end signal 25 and at the same time outputs the converted digital value as a converted data 26. The conversion end signal 25 is detected by the computing section 201 through the I/O interface 204, whereupon the computing section 201 inputs the converted data 26 through the I/O interface 204 thereby detecting the ambient temperature of the digital display unit 5.

On the other hand, in the temporary memory 8, ON-OFF conditions within a certain period of time from the past up to the present of all the segments in ×1 digit and ×10 digit of the digital display unit 5 are delivered from the processing unit 2 and stored therein. These ON-OFF conditions are output from the computing section 201 at every 500 ms of display renewal, and first an address to be stored in the temporary memory 8 is output to an address line 80 through a memory interface 205. Then, data to be written in that address are output to a data line 81 through a memory interface 205 whereby ON-OFF states are stored in that address of the temporary memory 8. In this case, as addresses to be selected in the temporary memory 8, there are used addresses of data which have become unnecessary among the past data. Next, when the computing section 201 computes data to be output to the digital display unit 5, in order to refer to the past ON-OFF states, it puts out onto the address line 80 the address in the temporary memory 8 where the data to be referenced is stored. As a result, data corresponding to the ON-OFF conditions are output from the temporary memory 8 to the data line 81 and are input into the computing section 201 through the memory interface 205. Such writing and reading operations for the temporary memory 8 are performed by a control line 82.

When the ambient temperature is high and the response speed of the digital display unit 5 is high, the temperature detector 6 signals the processing unit 2 through the A-D converter that the ambient temperature is high. The processing unit 2 outputs a signal of the same contents as an ON or OFF signal for each segment at every 10 msec and renews this output signal at every 500 msec. Therefore the digital display unit 5 makes the same display at every 10 msec and renews the display at every 500 msec.

On the other hand, when the ambient temperature has lowered, a low temperature signal is provided from the temperature detector 6 to the processing unit 2, whereupon ON history of each segment to be turned ON is read out of the memory 8, and with this ON history there is made transfer of data from the processing unit 2 to the shift register 3 while shifting the driving timing for each segment at every renewal of display. After 500 msec from the data transfer, the next renewal of display is performed while also shifting the segment driving timing, and this operation is repeated.

Thus, in conformity with the timing at which the segments to be turned from ON to OFF of the digital display unit 5 actually starts to turn off, it is possible to turn on the segments to be turned ON. Consequently, an erroneous display time of the digital display unit 5 becomes shorter than the discriminatable time, thereby permitting a correct discrimination.

In the above embodiment the present invention was applied to a vehicular speedometer, but the invention is also applicable to display devices wherein the response time changes according to temperatures and lighting history. In display devices greated affected by either the lighting history or temperature, each segment may be controlled according to the influential factor.

In the processing section, usually a temporary memory is provided, so this portion may be used as a lighting history memory, and also an A-D converter is already mounted in many cases for other purposes, so its additional provision is not needed. Consequently, all that is required is to merely add small-sized components, that is, a less expensive display device with delay time compensation is obtainable.

Figure 2:
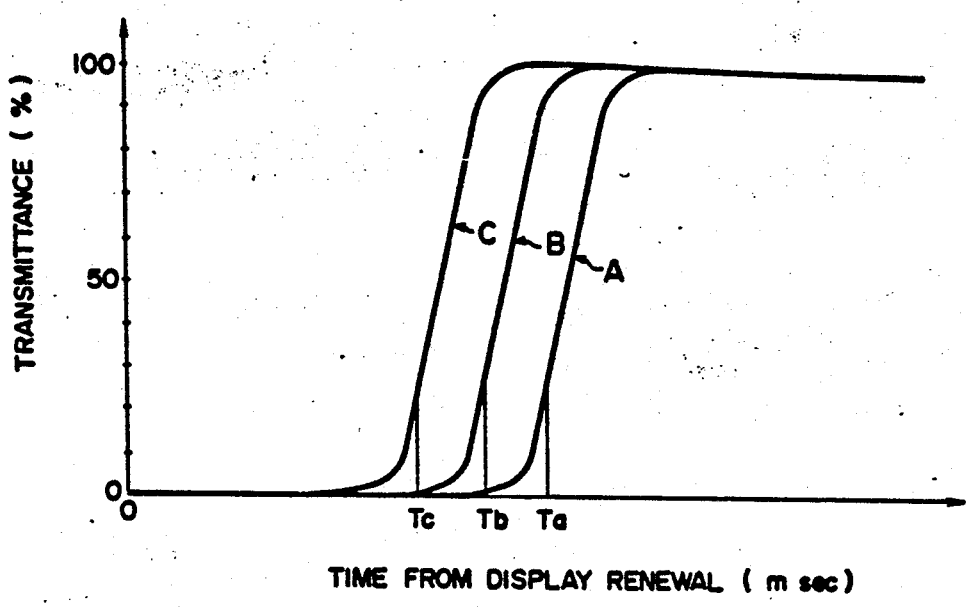
FIG. 2 is a graph showing a response delay of lighting based on ON-OFF history of liquid crystal segments according to a second embodiment of the present invention.
Figure 3:
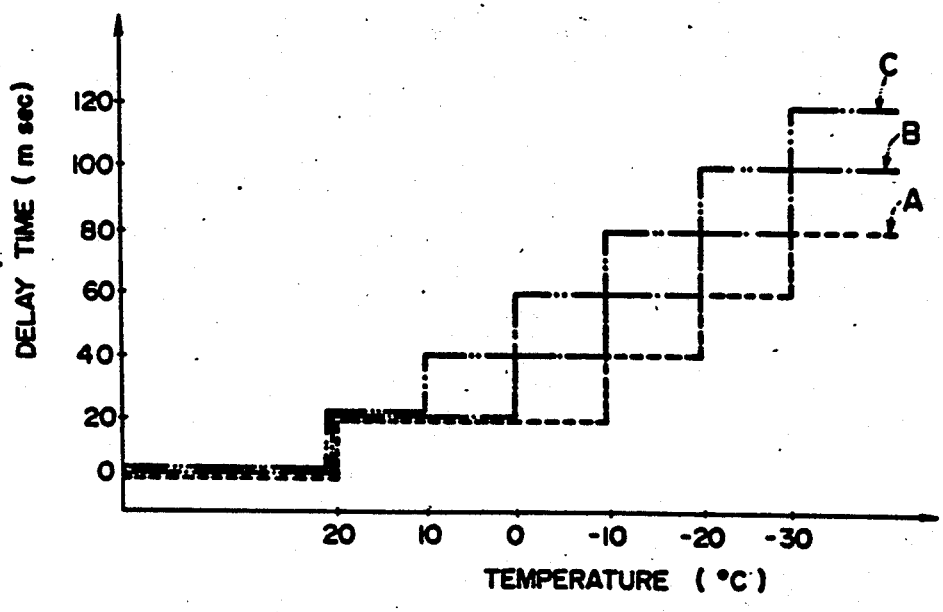
FIG. 3 is a graph showing delay time of lighting vs. temperature based on ON-OFF history of the liquid crystal segments in the second embodiment.
Figure 4:
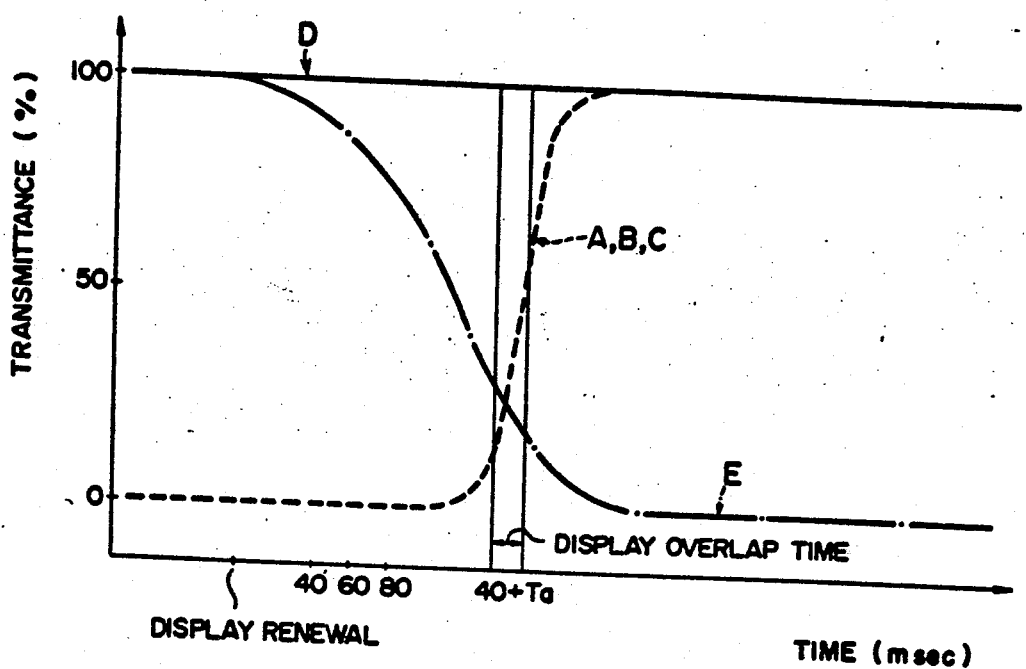
FIG. 4 is a graph showing the change in transmittance at $-15°$ C. in ON and OFF states of each segment in the second embodiment.

Referring now to FIGS. 2 through 4, there is illustrated a second embodiment, which concretely shows how to light segments to be turned from OFF to ON according to their lighting history using the speedometer shown in the first embodiment. The digital display unit 5 consists of three 7-segment liquid crystals arranged side by side to display a 3-digit numeral, and it is of the light transmission type wherein light is directed from behind to the liquid crystals using a lamp as a light source. In the segments of each said liquid crystal, when the temperature falls below normal temperature, for example, at $-20°$ C., with respect to segment A which has been OFF in the three preceding displays and which is to be turned ON, as shown in FIG. 2, a transmittance at which the light from behind becomes discriminatable is reached after Ta msec from the time when the latch driver is operated with a display renewal signal. With respect to segment B which has been OFF in the two previous displays and ON in the display three times before and which is to be turned ON, as shown in B in FIG. 2, a transmittance at which the light from behind becomes discriminatable is reached after Tb msec from the time when the latch driver is operated with a display renewal signal. Further, with respect to segment C which was OFF in the previous display and ON in each display two and three times before and which is to be turned ON, as shown in C in FIG. 2, a transmittance at which the light from behind becomes discriminatable is reached after Tc msec from the time when the latch driver is operated with a display renewal signal. In those segments, $Ta > Tb > Tc$. Such a characteristic is recognized also at high temperatures, but has no bad influence upon discriminatability because $Ta \approx Tb \approx Tc \approx 0$ and is negligible.

Therefore, when the temperature of liquid crystal is low, the processing unit 2 is operated so that ON signals for segments are delayed according to their lighting history to make discriminatable simultaneously the segments which have turned ON from OFF.

The display holding time is calculated from the time when a display renewal signal was issued.

The temperature detector 6 outputs signal about the temperature of the digital display unit 5 or therearound to the processing unit 2 through the A-D converter 7. With this signal, the processing unit 2 discriminates under which of the following seven temperature reanges the ambient temperature falls: above 20° C. incl., below 20° C. and above 10° C. incl., below 10° C. and above 0° C. incl., below 0° C. and above −10° C. incl., below −10° C. and above −20° C. incl., below −20° C. and above −30° C. incl., below −30° C.

For the segments A, B and C having a lighting history, the processing unit 2 delays their lighting in the above-mentioned temperature range as is graphically shown in FIG. 3. In the case of segment D which turns from ON to ON, as shown in FIG. 4, there is no delay time and its lighting is continued. At −15° C. is the ambient temperature of the digital display unit 5, as shown in FIG. 4, the segment D and segment E turn ON, which are discriminatable on the digital display unit 5.

Now, consider the case where at the time of renewal of digital display, the segment D is to be kept ON, the segment E is to be turned OFF and the segments A, B, C are to be newly turned ON. In this case, the segments A, B and C have the respective ON-OFF histories as previously noted in connection with FIG. 2. Therefore, on the basis of those ON-OFF histories read out of the temporary memory 8, the processing unit 2 provides signals for keeping ON the segment D and turning OFF the segment E to the shift register 3 and then immediately to the latch driver 4, allowing the segment D of the digital display unit 5 to remain ON and the segment E to go OFF. As a result, the segment E exhibits such a change in transmittance as shown in E in FIG. 4 and gradually shuts off light from the light source, and after about 180 msec the display of the segment E becomes indiscriminatable. The segment A has been OFF in the three previous displays, so the processing unit 2 provides a signal for turning ON the segment A 40 msec behind the time when the segment E was turned OFF, that is, the time of display renewal, to the shift register 3, and the shift register 3 immediately sends the segment A ON signal to drive the latch driver 4, allowing the latter to operate to apply voltage for turning ON the segment A. As a result, the segment A exhibits such a change in transmittance as shown in FIG. 4. That is, after 40 msec+Ta msec, the segment A becomes discriminatable. For the segment B, the processing unit 2 provides an ON signal, 60 msec behind the time of display renewal, to the latch driver 4 through the shift register 3, so that the segment B becomes discriminatable after 60 msec+Tb msec from the time of display renewal. Furthermore, for the segment C, the processing unit 2 provides an ON signal, 80 msec behind the time of display renewal, to the latch driver 4 through the shift register 3, so that the segment C becomes discriminatable after 80 msec+Tc msec from the time of display renewal. Since the above values of 40, 60 and 80 msec are appropriate correction values for Ta, Tb and Tc, respectively, the segments A, B, and C becomes discriminatable simultaneously.

For segments which turn ON in the same way as above at below 20° C., ON signals are generated in a delayed manner from the time of display renewal as is shown in FIG. 3. At above 20° C., all segment outputs keep their contents unchanged except at the time of display renewal. That is, all segments keep no delay time.

Consequently, the segments A, B and C which turn from OFF to ON become discriminatable simultaneously, so the discriminatability is improved. Besides, the transmittance of the segments A, B and C becomes high after that of the segment E became low, so that the time interval at which the previous display and the present display are seen overlappedly is very short and can scarcely be recognized. Therefore, when the vehicle driver glances at the speedometer during vehicle operation, there is no fear of an erroneous display or misunderstanding, and thus the discriminatability is high.

The delay time and temperature range in the above embodiment may be changed according to the kind of liquid crystal and working conditions. In the above embodiment, moreover, the delay time correction was set at every 20 msec, but since segment ON-OFF signals are output at every 10 msec, the correction may be set at every 10 msec. If the actual ON-OFF display occurs almost simultaneously, the correction may be made at a larger multiple of 10 msec in the range in which the discriminatability is not deteriorated. Also as to the temperature range, for example, in the case of liquid crystal, its response speed becomes lower exponentially with lowering of temperature, so the temperature may be narrower at lower temperatures. In addition, the delay time may differ from the segment ON-OFF signal output cycle to the latch driver 4. In this case, from the standpoint of discriminatability, it is preferable to shorten such output cycle.

In the above embodiments, changes in temperature are accompanied by changes in delay time, but since the display holding time is constant, the time interval from a display renewal to the next display renewal is constant according to temperatures. Alternatively, the display renewal time may be made constant, while the delay time and the display holding time may be changed according to changes in temperature.

In the above embodiments, moreover, the delay time was controlled on the basis of the three previous ON-OFF states before the display renewal about to be performed. But the delay time may be controlled on the basis of at least two previous conditions of display.

Figure 5:
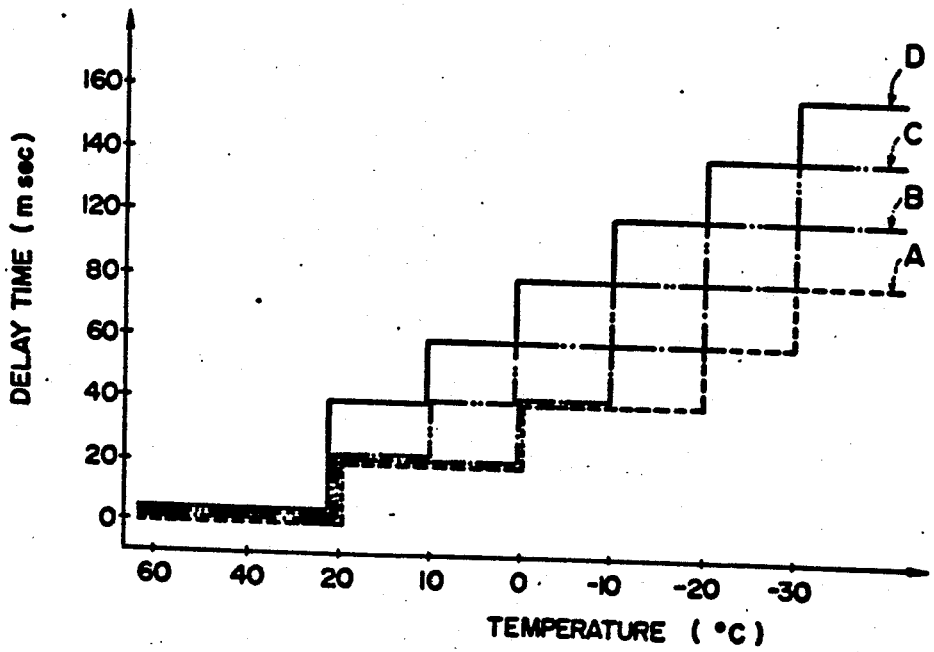
FIG. 5 is a graph showing the function of a third embodiment of the present invention.

In the second embodiment the segment which turns from ON to ON at the time of display renewal continues to light regardless of temperature, but in the embodiment illustrated in FIG. 5, an OFF signal is once output to said segment, and after the lapse of a certain delay time an ON signal is again issued to decrease the difference in luminance of each segment under display renewal thereby improving the discriminatability. That is, the segment D turning from ON to ON exhibits the least response delay with lowering of temperature, so is given the largest delay time. At above 20° C., all segments keep no delay time.

The processing unit 2 in the above embodiments was constructed of a microcomputer, but even if it is configured by the combination of LSI, etc., the same function and effect are attainable.

In the above embodiments, moreover, the digital display device was applied to a 3-digit speedometer. In this case, the display of the third location (the leftmost digit) undergoes only a very small change, so even if the foregoing delay operation is not applied, there does not arise any practical problem.

What is claimed is:

1. A display device with delay time compensation having a segment type digital display unit, comprising a memory section for storing activation history for each segment in said display unit, a temperature detector for detecting the temperature adjacent said display unit, and a control section having means coactive with said memory section and said temperature detector for controlling the driving timing independently for each segment in said display unit as a function of individual activation history of the corresponding segment and in response to a temperature detector output corresponding to a detected temperature, thereby to effect compensated values of time of energization of each individual segment to effectuate substantially simultaneous display renewal of each individual segment and discriminability at the same time.

2. A display device with delay time compensation according to claim 1, wherein said each segment is constructed of liquid crystal.

3. A display device with delay time compensation according to claim 1, wherein said each segment is constructed of electrochromic material.

4. A display device with delay time compensation according to claim 1, in which said control section means comprises delay means for delaying the driving timing for each segment at the time of renewal of display on the basis of at least two preceding ON or OFF histories stored in said memory section.

5. A display device with delay time compensation according to claim 4, wherein the delay means of said control section has means to effect delay time effects time delays for effective renewal of segments in dependence upon OFF history thereof and the time delay is longer for segments having a shorter OFF history than those having a longer OFF history.

6. A display device with delay time compensation according to claim 4, wherein the delay means of said control section comprises means to effect delay time delay for effective renewal of said segments in dependence upon detected temperatures from the temperature detector, and the time delay is longer for low temperatures.

7. A display device with delay time compensation according to claim 6, wherein the delay means comprises means to effect delay time at lower detected temperatures from the temperature detector effective so that all segments turning from OFF to ON are discriminatable about the same time.

8. A display device with delay time compensation according to claim 4, wherein the control section means comprises means for making display holding time of the display unit constant.

9. A display device with delay time compensation according to claim 4, wherein the control section means comprises means for making time from a display renewal to the next display renewal constant.

10. A display device with delay time compensation according to claim 4, in which the control section means comprises means effective when a segment which was ON just before a display renewal is to be again turned ON for display renewal, effects the display renewal while retaining the ON state if it is just before the display renewal of the corresponding segment.

11. A display device with delay time compensation according to claim 4, in which said control section means comprises means effective when a segment which was ON just before a display renewal is to be again turned ON outputs an OFF effecting signal at the time of the display renewal generates an ON effecting signal after the time of the display renewal at a time according to the detected temperature from the temperature detector.

12. A display device with delay time compensation according to claim 1, in which said control section means comprises means effective such that when the contents of a display just before a display renewal and the contents of the display about to be displayed are coincident with each other, segment driving output is not changed at all and is continued before and after the display renewal.

13. A display device with delay time compensation having a segment type digital display unit, comprising a memory section for storing activation history for each segment in said display unit, a temperature detector for detecting the temperature adjacent said display unit, and a control section having means coactive with said memory section and said temperature detector for controlling the driving timing independently for each segment in said display unit as a function of individual activation history of the corresponding segment and in response to a temperature detector output corresponding to a detected temperature, thereby to effect compensated values of time of energization of each individual segment to effectuate substantially simultaneous display renewal of each individual segment and discriminability at the same time.

14. A display device with delay time compensation having a segment type digital display unit, comprising a memory section for storing activation history for each segment in said display unit, and a control section having means coactive with said memory section for controlling the driving timing independently for each segment in said display unit as a function of individual activation history of the corresponding segment, thereby to effect compensated values of time of energization of each individual segment to effectuate substantially simultaneous display renewal of each individual segment and discriminability at the same time.

* * * * *